May 17, 1927.
J. R. GEISINGER
1,629,442
FLYING DUCK DECOY
Original Filed Sept. 22, 1923   2 Sheets-Sheet 1
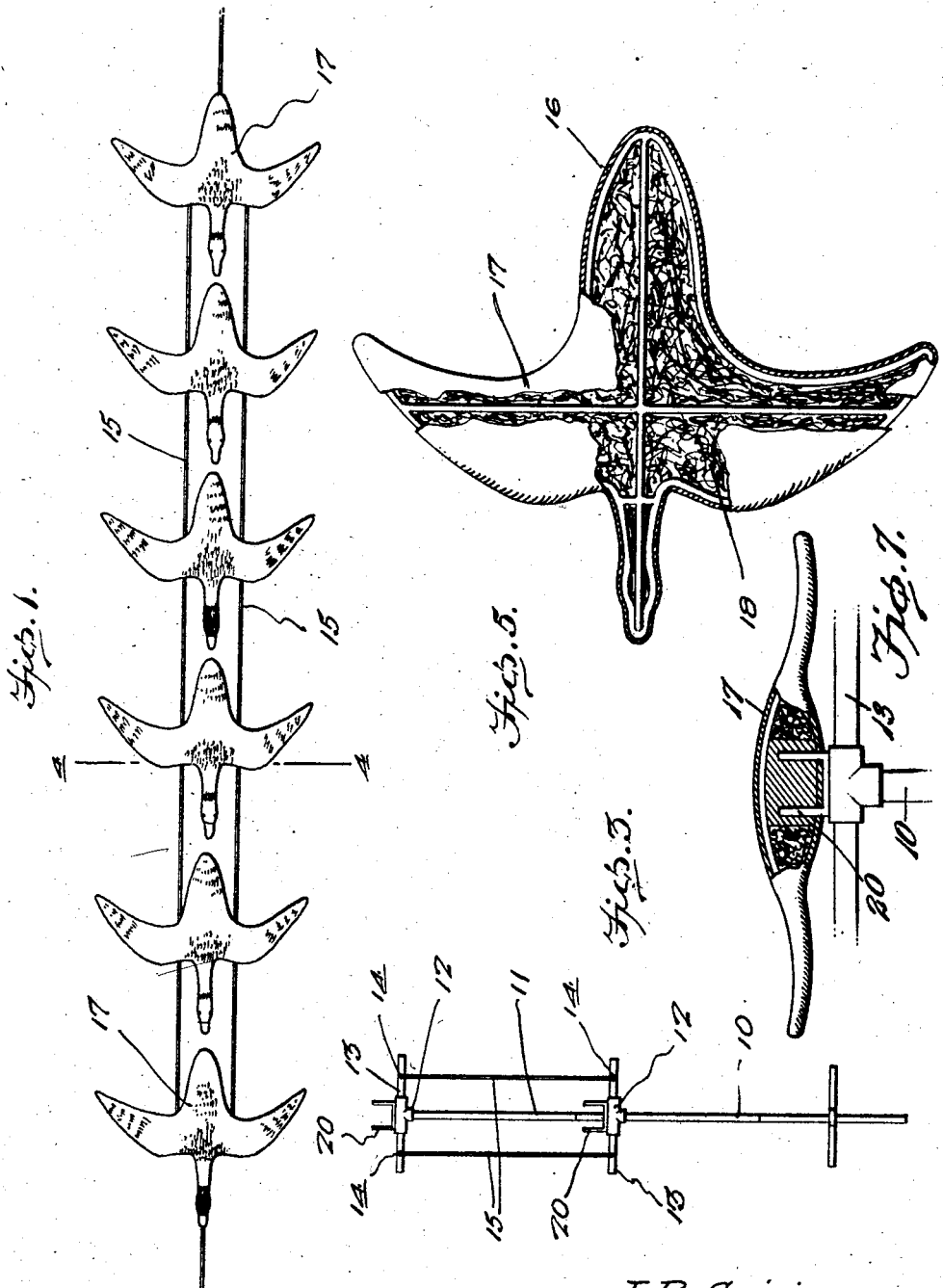

May 17, 1927.
J. R. GEISINGER
1,629,442
FLYING DUCK DECOY
Original Filed Sept. 22, 1923    2 Sheets-Sheet 2
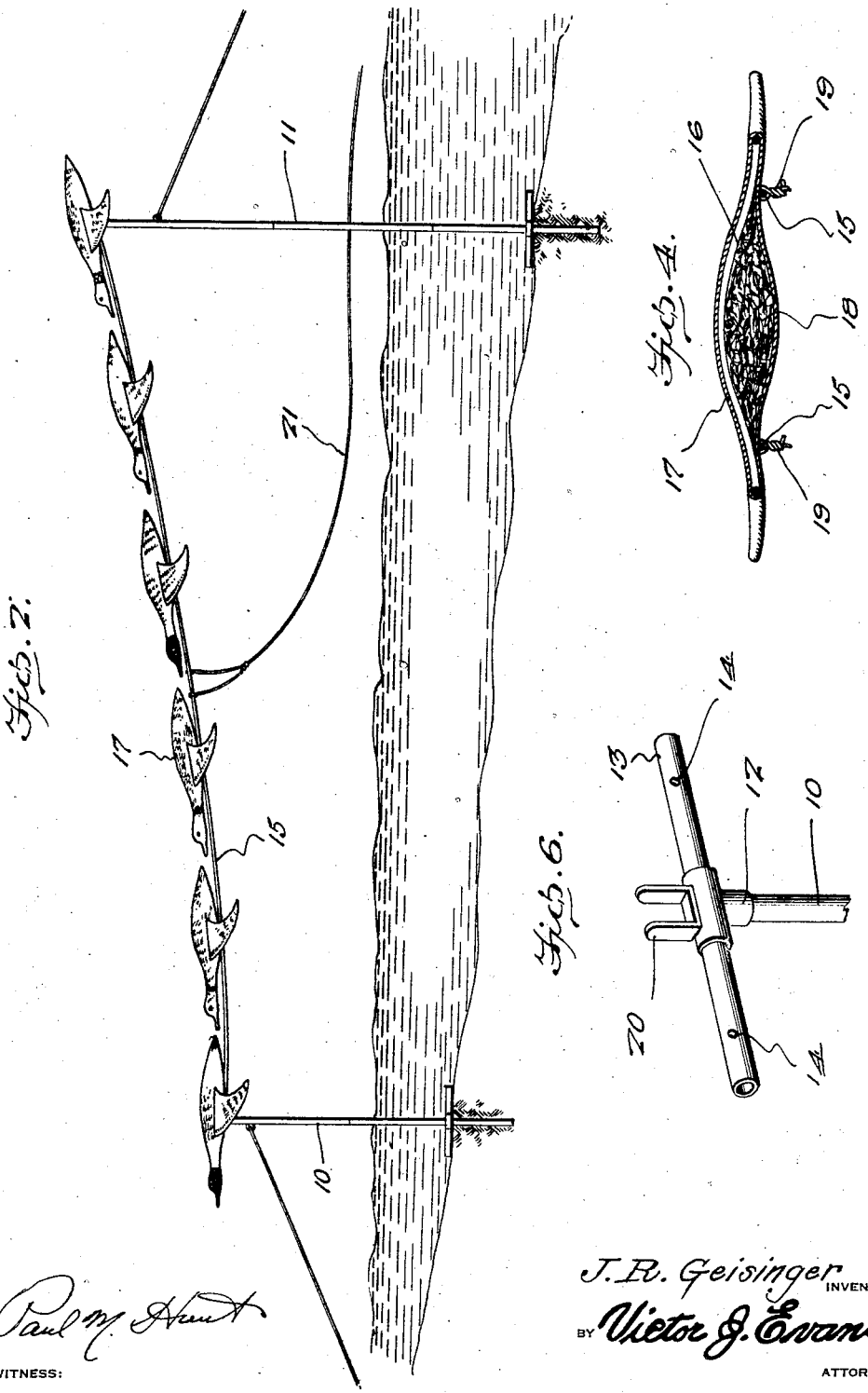
J. R. Geisinger INVENTOR
BY Victor J. Evans ATTORNEY Patented May 17, 1927.

1,629,442

UNITED STATES PATENT OFFICE.

JOSEPH R. GEISINGER, OF GRAND ISLAND, NEBRASKA.

FLYING-DUCK DECOY.

Application filed September 22, 1923, Serial No. 664,298. Renewed October 18, 1926.

This invention aims to provide flying ducks and geese decoys, and embodies amongst other features a plurality of spaced parallel wires arranged upon an inclined plane, and upon which the images representing the ducks or geese are mounted to afford the appearance of said images flying against the wind to light, the wings of said images being moved by the wind pressure as will be readily understood.

The nature and advantages of the invention will be better understood when the following detailed description is read in connection with the accompanying drawings, the invention residing in the construction, combination and arrangement of parts as claimed.

In the drawing forming part of this application, like numerals of reference indicate similar parts in the several views, and wherein:

Figure 1 is a top plan view of the invention.

Figure 2 is a side elevation.

Figure 3 is an end elevation.

Figure 4 is a sectional view taken on the line 4—4 of Figure 1.

Figure 5 is an enlarged fragmentary view of the image representing the duck.

Figure 6 is a detail view of the T-shaped coupling.

Figure 7 is an enlarged detail view partly in section showing how one of the decoys is mounted on the U-shaped bracket.

The invention makes use of a pair of spaced uprights 10 and 11 respectively, and it is to be understood that these uprights can be constructed from any suitable material and vary in dimensions without departing from the spirit of the invention except that the upright 10 is to be considerably shorter than the upright 11. Each upright may be formed from a single piece of material, but they are preferably made up of sections, so that the uprights can be reduced in size when it is desired to collapse the structure for any purpose whatsoever. The respective sections of each upright can also be connected together in any suitable manner, as clearly shown in the drawings. Mounted on the upper end of each upright is a T-shaped coupling, the stem 12 of which is designed to accommodate itself to the upright, while the head 13 of each coupling is perforated as at 14 for a purpose to be presently described. It will be noted that the heads 13 of these couplings are arranged in parallel planes, and the openings or perforations 14 are disposed to receive the strands of wire 15. These wires are drawn taut and suitably spaced apart to accommodate the decoy proper, any number of wires being employed, which fact depends upon the number of decoys to be used. There are two of these wires used for each decoy, and of course, by reason of the variance of heights of the respective uprights, the wires are arranged at an inclination so as to make it appear as though the decoys are flying against the wind to light. The decoys consist of images representing ducks or geese, and are made up of a wire frame of proper configuration, which is covered with a good strong canvas or other suitable material that is not affected by wind or rain. The frame is indicated at 16 while the covering is represented at 17. The cover of course is stuffed with any suitable material, indicated at 18, straw being preferably used for this purpose. The decoys are placed upon the wires and fastened under the wings to the wire 15 by soft wire 19 or in any other suitable manner. However, the first and last decoy is supported by a U-shaped bracket 20 carried by the uprights 10 and 11 respectively. For this purpose, the decoy is preferably provided with a block of any suitable material arranged within the decoy, and having spaced slots to receive the limbs of the U-shaped bracket as shown in Figure 7. I also connect a thin wire or flexible element 21 to the wires 15, the element 21 being extended to the blind or boat, so that when there is not a strong enough wind to actuate the decoys, this may be accomplished by pulling on the element 21.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A decoy comprising a supporting structure including spaced parallel strands of wire arranged on an inclined plane, and images representing ducks or geese mounted on said wires and adapted to be actuated by wind pressure to afford the appearance of decoys flying against the wind and downwardly as if about to light.

2. A decoy comprising a supporting structure including spaced parallel strands of wire arranged on an inclined plane, a plurality of images representing ducks or geese mounted on said wires to afford the appearance of flying downwardly and about to light, means for securing said images to the wires, said images being adapted to be actuated by wind pressure, and a flexible element terminally connected with said wires and adapted to be used to cause movement of said images in the absence of sufficient wind for this purpose.

In testimony whereof I affix my signature.

JOSEPH R. GEISINGER.